United States Patent
Bae et al.

(10) Patent No.: US 7,543,046 B1
(45) Date of Patent: Jun. 2, 2009

(54) METHOD FOR MANAGING CLUSTER NODE-SPECIFIC QUORUM ROLES

(75) Inventors: Myung M. Bae, Pleasant Valley, NY (US); Steven R. Champagne, Carmel, IN (US); Robert K. Gardner, Saugerties, NY (US); Felipe Knop, Lagrangeville, NY (US); Johannes M. Sayre, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/130,080

(22) Filed: May 30, 2008

(51) Int. Cl.
*G06F 15/177* (2006.01)
*G06F 15/173* (2006.01)
*G06F 15/16* (2006.01)
*G06F 11/00* (2006.01)

(52) U.S. Cl. .................. 709/220; 709/221; 709/222; 709/223; 709/224; 709/225; 709/226; 709/229; 714/1; 714/2; 714/3; 714/4; 714/100; 715/734; 715/735; 715/736

(58) Field of Classification Search ......... 709/220–226, 709/229; 714/1–4, 100; 715/734–736
See application file for complete search history.

(56) References Cited

U.S. PATENT DOCUMENTS

| | | | |
|---|---|---|---|
| 6,542,929 B1 * | 4/2003 | Briskey et al. | 709/223 |
| 6,662,219 B1 | 12/2003 | Nishanov et al. | |
| 6,769,008 B1 * | 7/2004 | Kumar et al. | 709/201 |
| 6,877,107 B2 * | 4/2005 | Giotta et al. | 714/4 |
| 6,904,448 B2 | 6/2005 | Johnson et al. | |
| 6,938,084 B2 | 8/2005 | Gamache et al. | |
| 6,990,379 B2 * | 1/2006 | Gonzales et al. | 700/19 |
| 7,016,946 B2 | 3/2006 | Shirriff | |
| 7,320,085 B2 * | 1/2008 | Bain | 714/4 |
| 7,403,996 B2 | 7/2008 | Halpern | |
| 2004/0205148 A1 | 10/2004 | Bae et al. | |
| 2004/0254984 A1 * | 12/2004 | Dinker | 709/205 |
| 2005/0144199 A2 * | 6/2005 | Hayden | 707/204 |
| 2007/0016822 A1 | 1/2007 | Rao et al. | |
| 2007/0022314 A1 | 1/2007 | Erasani et al. | |
| 2007/0094310 A1 * | 4/2007 | Passey et al. | 707/204 |
| 2008/0071878 A1 * | 3/2008 | Reuter | 709/208 |

\* cited by examiner

*Primary Examiner*—Jeffrey Pwu
*Assistant Examiner*—Joshua Joo
(74) *Attorney, Agent, or Firm*—Weitzman Law Offices, LLC; Kenneth S. Weitzman

(57) ABSTRACT

A method for managing node-specific quorum roles in a cluster of nodes. The method comprises assigning a configuration change of node role attributes to a node in the cluster, with each attribute being represented by a bit of a binary value. The binary value corresponding to the specified node role attributes is converted to an integer value and the integer value is stored in a node record associated with the node. The node record is accessed to isolate each bit of the integer value associated with the node and the node role attributes assigned to the node are identified from each of the isolated bits of the integer value associated with the node. A determination of whether the configuration change can be safely supported by a configuration quorum of nodes required to represent the cluster's configuration accurately is made based on the identified node role attributes. An additional determination of whether a required operational quorum of nodes permits access to critical and shared resources is made based on the identified node role attributes. Endorsement for the configuration change is sought from subsystems that may be affected by the configuration change. The identified node role attributes are propagated to other nodes within the cluster.

1 Claim, 7 Drawing Sheets

METHOD FOR MANAGING CLUSTER NODE-SPECIFIC QUORUM ROLES

BACKGROUND

1. Field of the Invention

This disclosure relates generally to networking systems and, more particularly, to a system for intelligent management of node quorum role settings.

2. Description of Related Art

Computer clusters are groups of interconnected computers ("nodes") associated in such a way as to facilitate interoperability and management. The nodes in a cluster work in tandem to provide superior performance and availability than that of a single computer. The nodes of a high availability cluster have redundant configurations so that any node in the cluster can seamlessly replace a failing node. A cluster configuration database may contain information about the role and status of each node. For example, some nodes may be active, while other nodes may be in standby. The configuration database may be stored on a network drive, which is shared among the nodes. Another approach is to store a copy of the database in each node of the cluster.

Currently, cluster-managing software allows a cluster's configuration to be changed when a "configuration quorum" of the total number of nodes can participate in making that change. A quorum may be equal to the total number of nodes in the cluster ("N") divided by two plus one ("N/2+1"). Given a cluster startup requirement that at least half the cluster nodes be available at startup time, these nodes guarantee to represent the latest, most accurate configuration of the entire cluster since all combinations of half the nodes will include at least one node with the latest version of configuration information.

Similarly, a cluster manager can permit access to critical cluster resources to nodes of an "operational quorum." The nodes of an operational quorum are greater than or equal to a simple majority. In a network-sundered situation the nodes belonging to the operational quorum will be permitted access to the cluster's critical resources. If there is an even number of nodes (and thus half the number of nodes is a tie), a deterministic tiebreaker mechanism can be executed that selects only one set of sundered sets of nodes as having operational quorum.

It is desirable to provide an intelligent means of managing node-specific roles so that a subset of all nodes may determine the quorum characteristics of the entire cluster. It would also be desirable for subsystems (e.g., non-interactive programs running on the nodes, such as daemons) to be able to utilize a quorum strategy to ensure their own configuration integrity. Current systems and methods do not facilitate coordination of node quorum roles between clusters and their respective subsystems.

BRIEF SUMMARY

A method for managing node-specific quorum roles in a cluster of nodes is disclosed herein. The method comprises assigning a configuration change of node role attributes to a node record in the cluster, with each attribute being represented by a bit of a binary value. The binary value corresponding to the specified node role attributes is converted to an integer value and the integer value is stored in a node record associated with the node. The node record is accessed to isolate each bit of the integer value associated with the node and the node role attributes assigned to the node are identified from each of the isolated bits of the integer value associated with the node. A determination of whether the configuration change can be safely supported by a configuration quorum of nodes required to represent the cluster's configuration accurately is made based on the identified node role attributes. An additional determination of whether a required operational quorum of nodes permits access to critical and shared resources is made based on the identified node role attributes. Endorsement for the configuration change is sought from subsystems that may be affected by the configuration change. The identified node role attributes are propagated to other nodes within the cluster The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWING

This disclosure is further described in the detailed description that follows, with reference to the drawing, in which.

DETAILED DESCRIPTION

This application discloses an improved system and method for managing node-specific quorum roles, which allows smaller node subsets to determine the quorum characteristics of the entire cluster.

Figure 1:
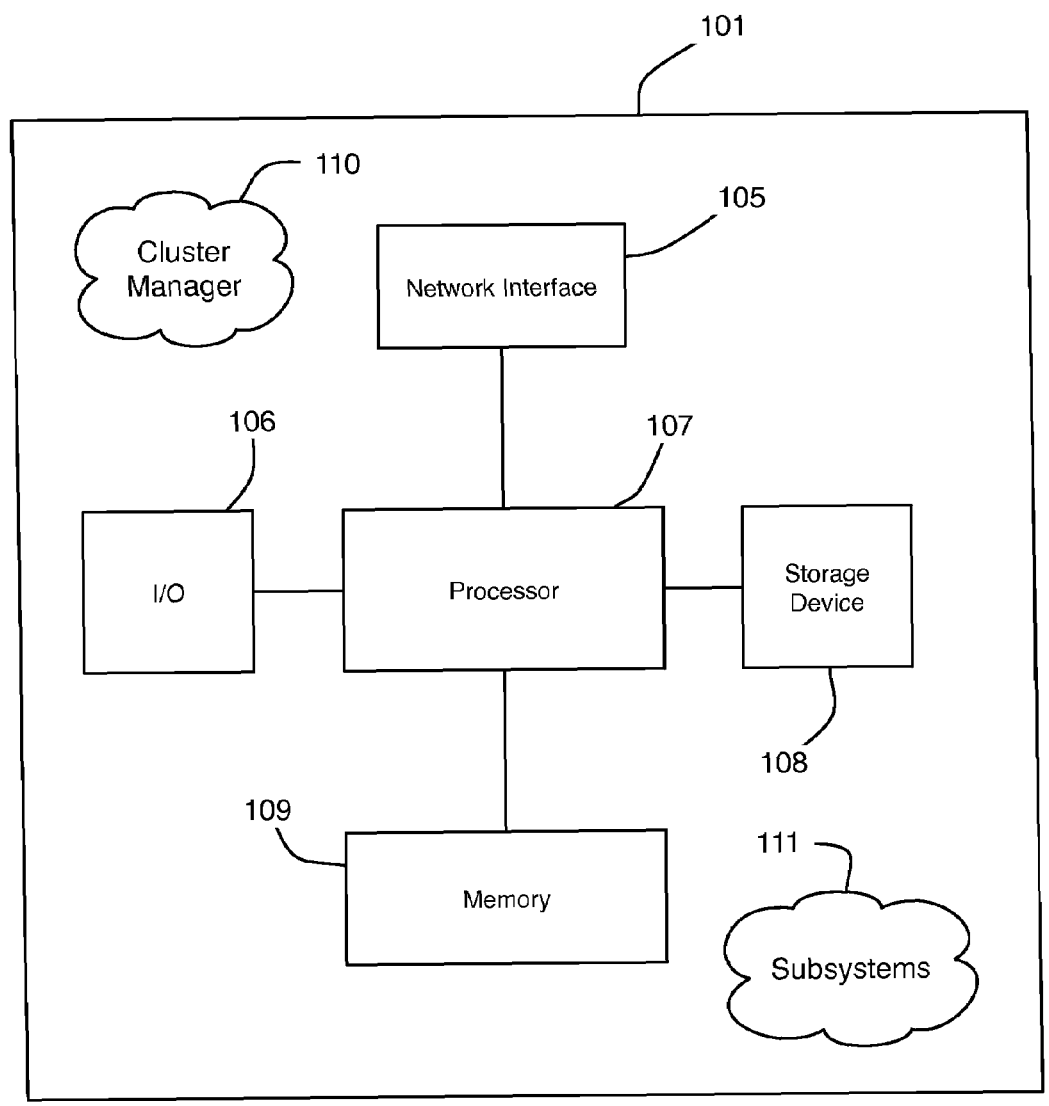
FIG. 1 is a high level diagram of an exemplary node computer.

The disclosed method may be implemented as a series of instructions in the cluster manager 110 of FIG. 1, executing on a computer 101, which may be a node within a cluster. Such computers executing programs are well known in the art and may be implemented, for example, using a well-known computer processor, memory units, storage devices, computer software, and other components. Each node in a cluster may have an executing instance of cluster manager 110. Cluster manager 110 may have an interface allowing an administrator to interact with cluster manager 110. Computer 101 may have one or more subsystems 111 providing a variety of services on computer 101. Cluster manager 110 may contain a series of programming instructions to allow cluster manager 110 to communicate any change in quorum role settings to subsystem 111. Subsystem 111 may also contain a series of programming instructions that allow subsystem 111 to communicate its approval or disapproval of the quorum role change.

Exemplary computer 101 preferably contains a processor 107 that controls the overall operation of computer 101 by executing computer program instructions defining such operation. The computer program instructions may be stored in a storage device 108 (e.g., magnetic disk) or any other computer-readable medium, and loaded into memory 109 when execution of the computer program instructions is desired. Thus, in one embodiment, the disclosed method may comprise computer program instructions 110 stored in memory 109 and/or storage device 108, and executed by processor 107. Computer 101 may also include one or more network interfaces 105 for communicating with other nodes in the cluster. Computer 101 may also include input/output devices 106, which represent devices allowing for user interaction with computer 101 (e.g., display, keyboard, mouse, speakers, buttons, etc.). One skilled in the art will recognize that an implementation of an actual computer may contain additional components and that FIG. 1 is a high level representation of some of the components of such a computer for illustrative purposes.

Storage device 108 may store a node registry file containing attributes assigned to each node in the cluster. Each node in the file may be assigned a signed or unsigned integer value. An exemplary node registry file with one entry could be "NODE1=23." The entry in the exemplary file assigns the variable "NODE1" the integer value of "23."

A series of programming instructions embedded in cluster manager 110 of FIG. 1 may open and read the node registry file from storage device 108. The variable NODE1 may be assigned a register address in processor 107 where the integer value "23" may be stored.

Figure 2:
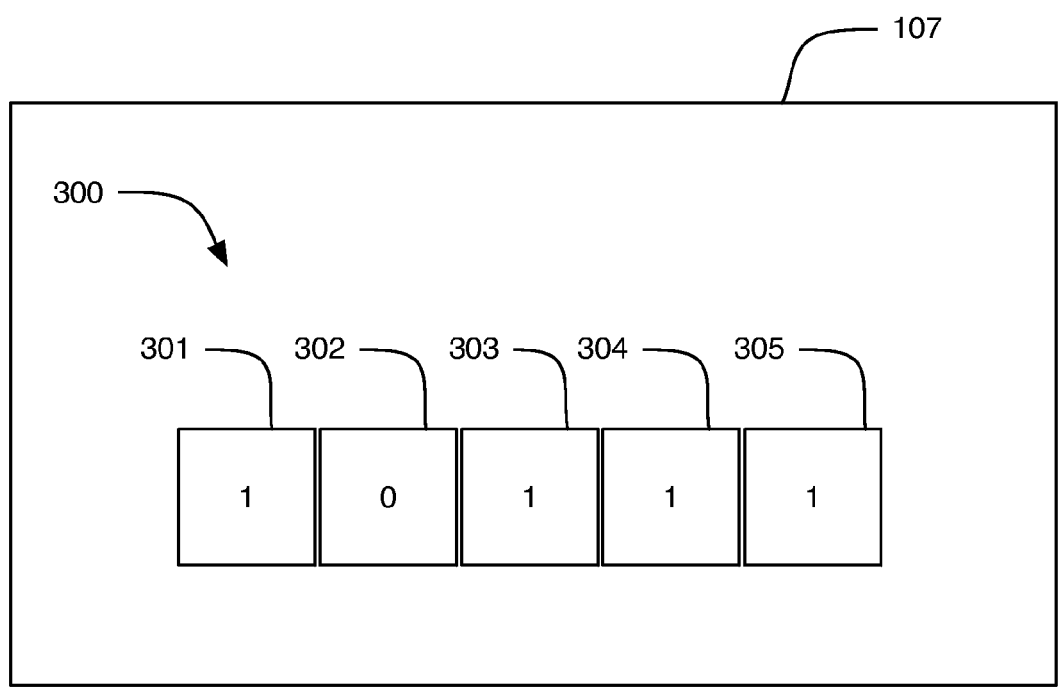
FIG. 2 is a preferred register containing a binary integer.

FIG. 2 illustrates an exemplary register 300 residing in processor 107 and containing the binary representation of the integer value "23" for NODE1. Each individual bit of the integer value may indicate the presence or the absence of node role attributes for the particular node. The first bit 305 may indicate whether the node is a quorum node. In the example illustrated in FIG. 2, the value of bit 305 is "1," which may indicate that NODE1 is a quorum node (whereas a bit value of "0" might indicate that the node is not a quorum node). The second bit 304 may indicate whether the node is a tiebreaker node. In the example of FIG. 2, the value of bit 304 is "1," which may indicate that NODE1 is a tiebreaker node (whereas a bit value of "0" might indicate that the node is not a tiebreaker node). The additional bits can indicate other node roles, such as whether the node is active. A series of programming instructions embedded within cluster manager 110 may use known bit level programming instructions to access each individual bit value of the stored integer value. The cluster manager 110 may have a user interface that allows a user to update the node role attributes in the node registry file. Alternatively, a series of programming instructions separate from the cluster manager 110 may provide a user interface and provide the necessary bit level operations.

Figure 3:
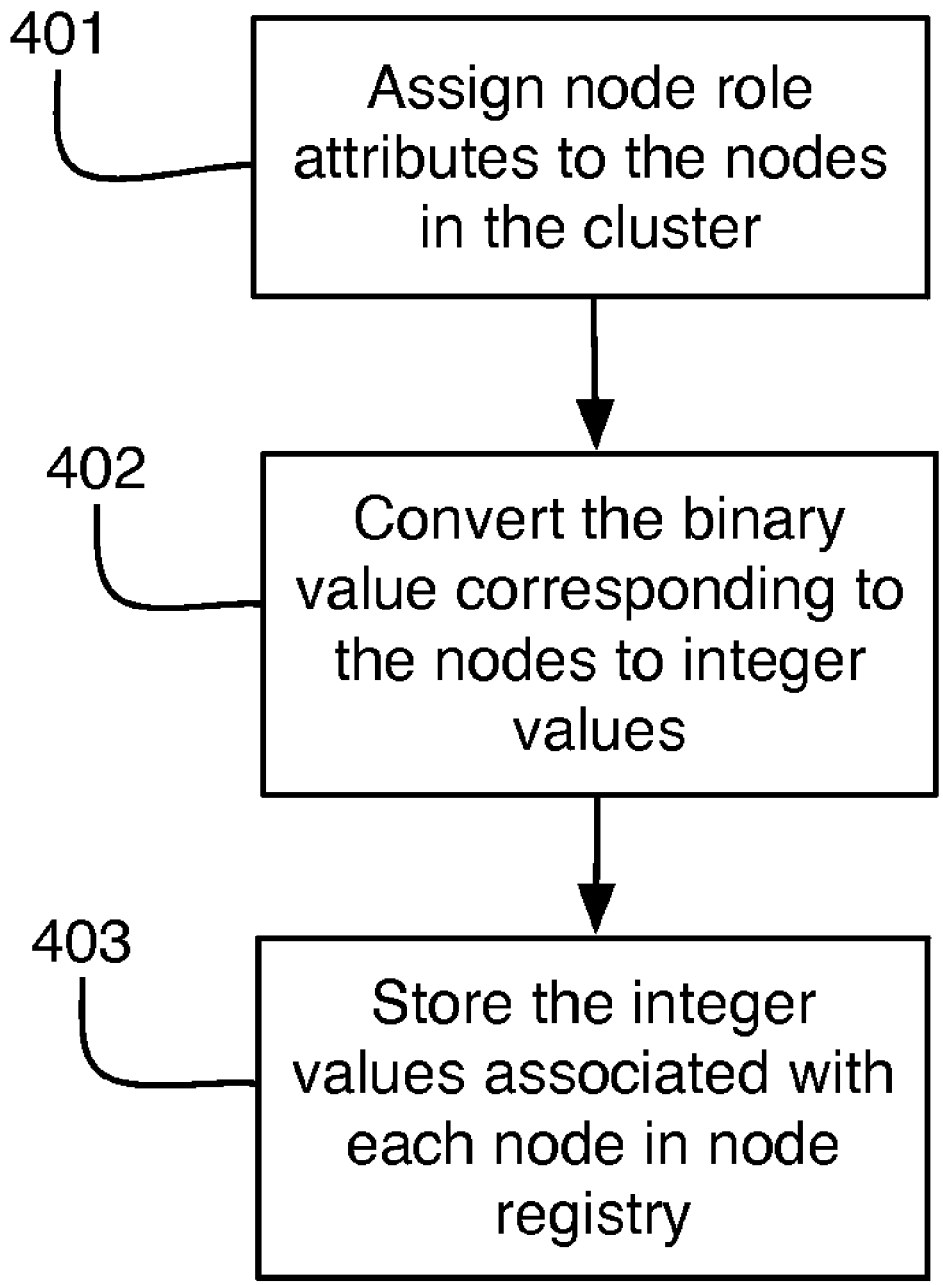
FIG. 3 is a preferred series of steps for assigning role attributes to each node in a cluster.

FIG. 3 illustrates a preferred series of steps that may be implemented for assigning the quorum node role values. In step 401, each node in the cluster may be assigned a binary value, with each bit corresponding to the specific node role attributes assigned to the particular node. This may be done manually using cluster administration software, which may allow an administrator to set each individual attribute with a "true" or "false" value.

In step 402, the binary value corresponding to the specified node role attributes assigned to each node is preferably converted to an integer value. In step 403, the integer values and their corresponding nodes may be stored as node records in the node registry.

Figure 4:
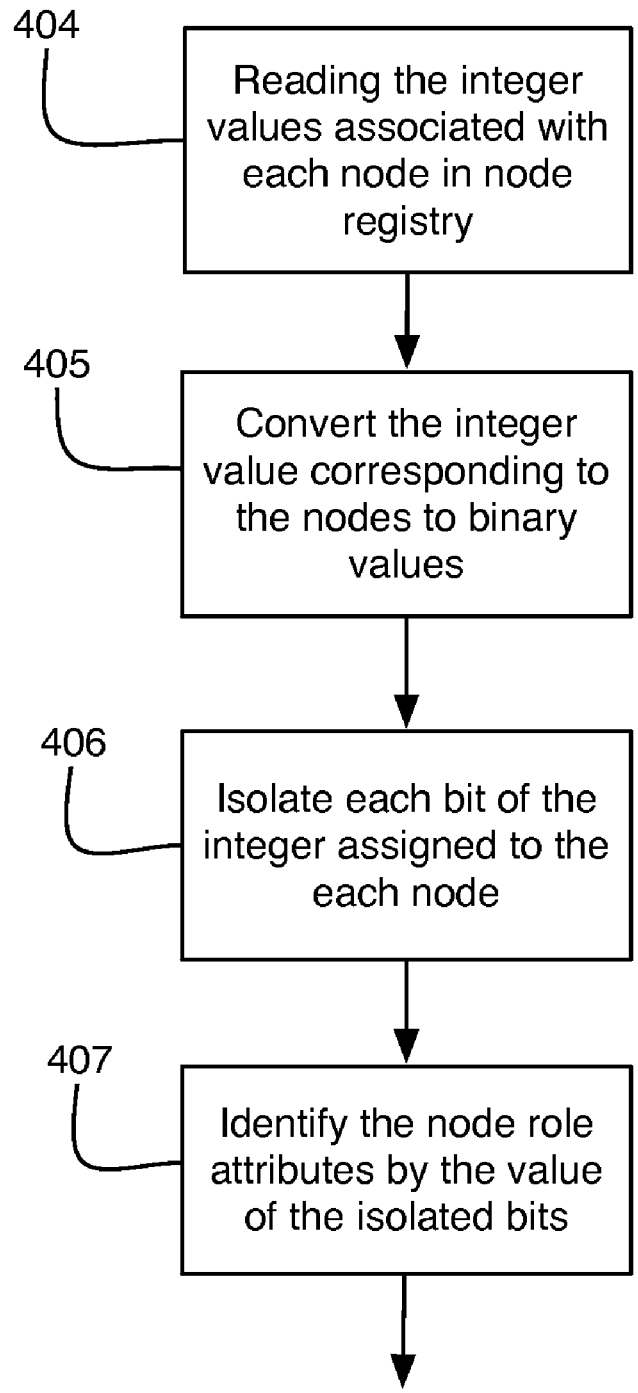
FIG. 4 is a preferred series of steps for extracting role attributes from a binary integer.

FIG. 4 illustrates a preferred series of steps that may be implemented for extracting the node role attributes from the stored integer values. In step 404, the node registry containing the node records may be accessed by another series of programming instructions, such as the cluster manager 110 or another independent executing program. Next, the first node record may be accessed and read in step 405. In step 406, known bit level operations may be used to isolate each individual bit of the binary value corresponding to the integer value stored in the node record for the node. In step 407, the node role attributes of the current node are identified in light of the isolated bit values. After the foregoing steps are completed, the method may continue to the preferred steps illustrated in FIGS. 5-7.

Figure 5:
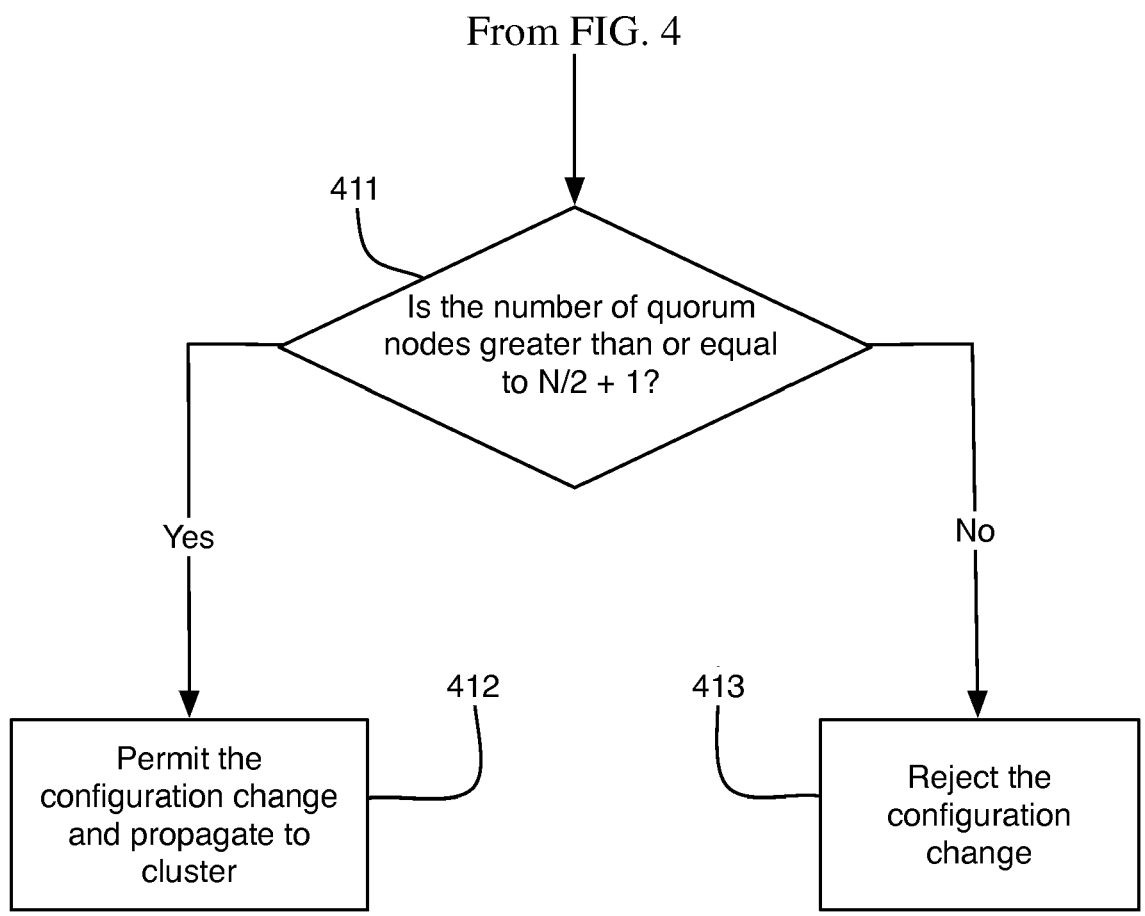
FIG. 5 is a preferred series of steps for validating the configuration quorum.

FIG. 5 illustrates the preferred series of steps for validating the configuration quorum, which is preferably embedded in cluster manager 110. In step 411, the cluster manager 110 confirms if the number of quorum nodes equals N/2+1. If so, the configuration change is allowed and propagated to the entire cluster in step 412. If not, the configuration change is rejected in step 413.

Figure 6:
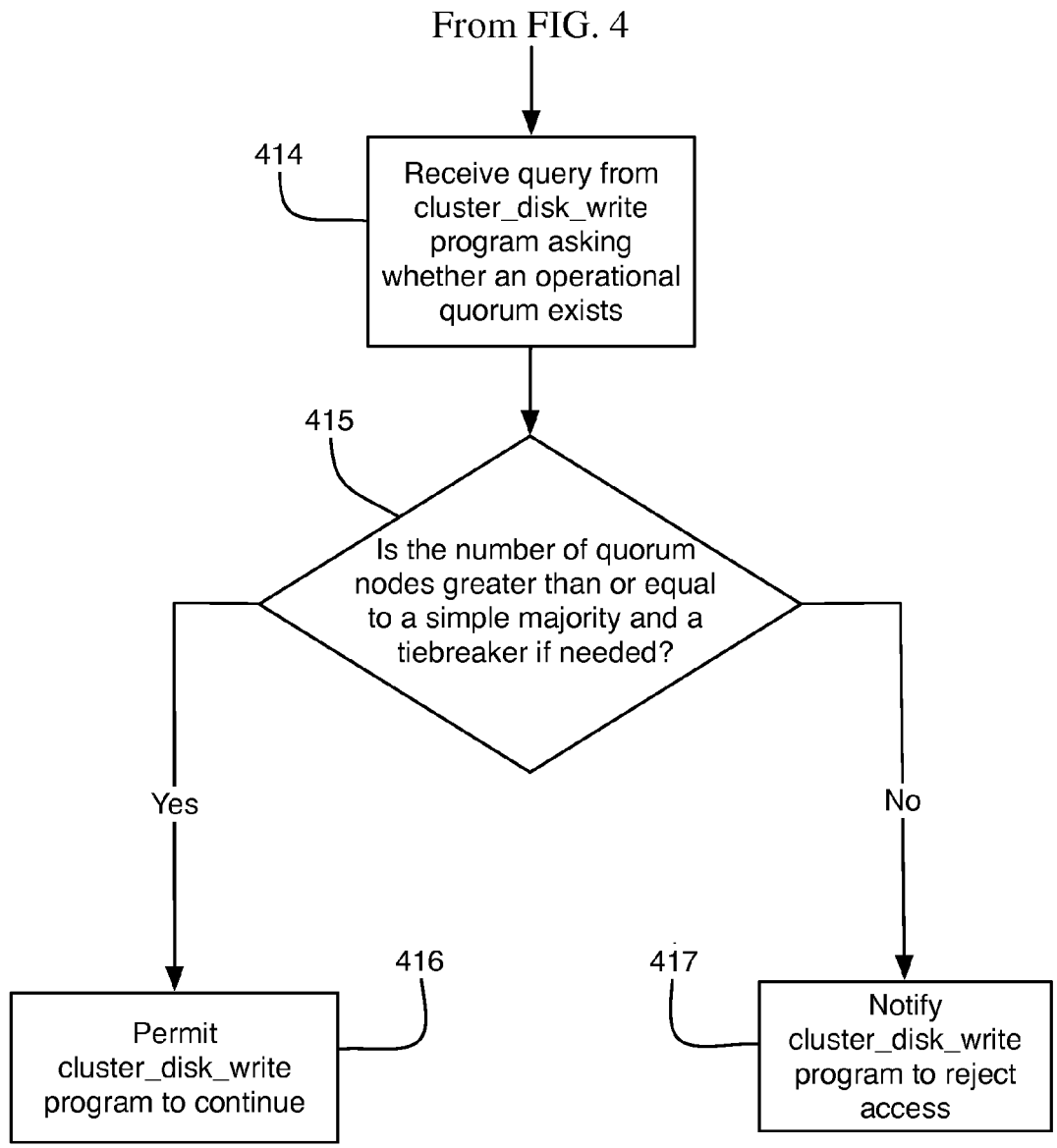
FIG. 6 is a preferred series of steps for validating the operational quorum.

FIG. 6 illustrates the preferred series of steps for answering a query from the cluster_disk_write application for whether a valid operational quorum exists. In step 414, the cluster manager 110 receives a query from the cluster_disk_write program asking whether an operational quorum exists. In step 415, the cluster manager 110 confirms if the number of operational quorum nodes equals a simple majority plus a tiebreaker, if necessary. If so, the cluster manager 110 permits the cluster_disk_write application to allow access to the shared resources in step 416. If not, the cluster manager 110 instructs the cluster_disk_write application to deny access in step 417.

Figure 7:
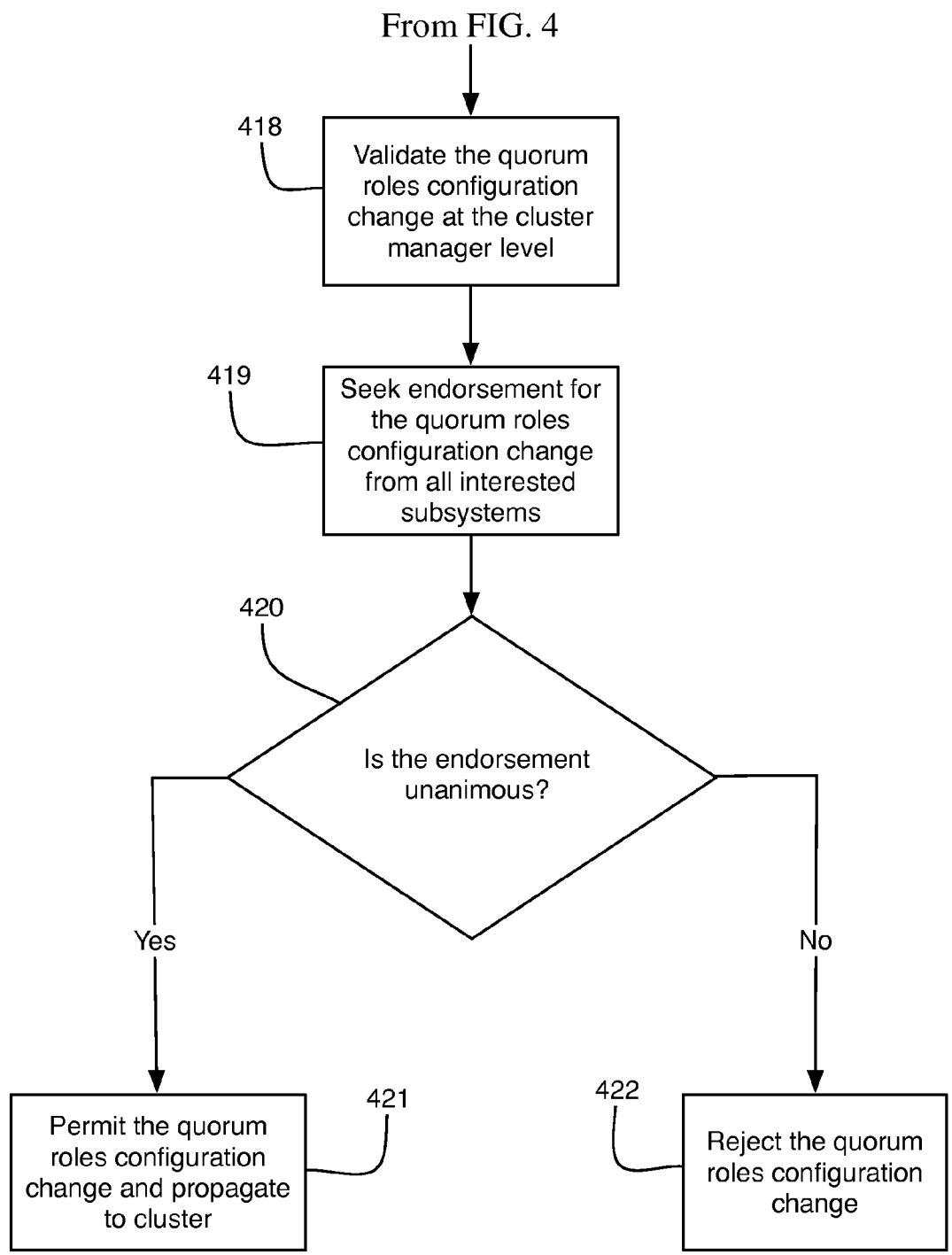
FIG. 7 is a preferred series of steps for general validation of a quorum role configuration change and for seeking endorsement from the subsystems.

FIG. 7 illustrates the preferred series of steps, which is preferably embedded in the cluster manager, for general validation of quorum roles configuration change and for seeking endorsement for that change from all the subsystems. In step 418, the cluster manager 110 performs general validation of the nodes, such as confirming that all the nodes are active. In step 419, the cluster manager seeks unanimous endorsement from all interested subsystems for the change. In step 420, the cluster manager checks if approval of the change is unanimous. If so, the change is allowed and propagated to the entire cluster in step 421. If not, the change is rejected in step 422.

The disclosed method provides more flexibility than the existing techniques described above since the quorum for the entire cluster may be represented by a smaller node subset. If an exemplary quorum strategy cluster of ten nodes wanted to attain "configuration quorum" status using conventional techniques, the cluster would need six nodes present (i.e., 10/2+1=6), and the cluster would only recognize an "operational quorum" of five nodes (i.e., 10/2) and a tiebreaker, if there were two sub-clusters of five. In contrast, the method disclosed herein would allow any subset of ten nodes to be configured as "quorum nodes," which can be further identified as "tiebreaker nodes."

In accordance with this application, an administrator may select the most reliable and available nodes to be configured as quorum nodes. A cluster administrator interface containing a series of programming instructions may run on, for example, computer 101. The cluster administrator software may allow an administrator to change the node settings and save it to the node registry file. The cluster administrator programming instructions may also display the current node settings to the user. Furthermore, validation logic could be encoded to make sure the current settings satisfy the configuration quorum. The cluster administrator instructions may also be embedded in cluster manager 110.

The cluster administrator interface may have an "add_cluster_nodes" or "delete_cluster_nodes" command that allows the administrator to add or delete nodes from the cluster. If an administrator elects to add nodes, the administrator may assign node role attributes to the new node. Once the attributes for the new nodes are assigned and entered, the cluster manager may validate the quorum role information. The cluster manager 110 may propagate this change to interested subsystems 111 to make sure they endorse the change. Each subsystem 111 may "accept" or "reject" the administrator's new settings. If the acceptance is not unanimous, the cluster manager 110 may reject this change and prompt the administrator to re-enter the quorum role settings. If the quorum role information is approved, the attributes may be stored in the node registry.

The cluster administrator interface may also have a "show_cluster_nodes" command that displays the current settings for all the nodes in the cluster. This command may access and read the contents of the node registry and display it on a computer screen, such as, for example, I/O 106.

The cluster administrator interface may also have a "change_cluster_config" command that allows an administrator to change the current settings of the node registry. The cluster manager 110 validates whether a "configuration quorum" of nodes is present before storing the configuration change in the node registry file.

The cluster administrator interface may also have a "change_quorum_role" command that allows the cluster administrator to change the quorum role of a node in the cluster. The cluster manager 110 may propagate this change to interested subsystems 111 to make sure they endorse the change. Each subsystem 111 may "accept" or "reject" the administrator's new settings. If the acceptance is not unanimous, the cluster manager 110 may reject this change and prompt the administrator to re-enter the quorum role settings.

An additional "cluster_disk_write" program, preferably executing on computer node 101, may attempt to give the node access to a disk shared by all the nodes in the cluster. The cluster_disk_write program may be responsible for avoiding conflicts with other nodes trying to access the same resources. The cluster_disk_write program may maintain communication with other cluster_disk_write programs executing in other nodes to coordinate access to the shared resources. The cluster_disk_write program may not account for a network-sundered situation, which would result in two or more sub-clusters unaware of each other's existence. In this situation, both sub-clusters may attempt to access the same resources at the same time. The cluster_disk_write program may query cluster manager 110 to determine whether an operational quorum exists.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A computer implemented method for managing node-specific quorum roles in a cluster of nodes, comprising:

assigning a configuration change of node role attributes to a node in a cluster, each node role attribute of the node role attributes represented by a bit of a binary value;

converting the binary value corresponding to the node role attributes specified by the configuration change to an integer value;

storing the integer value in a node record associated with the node;

accessing the node record and isolating each bit of the integer value associated with the node;

identifying the node role attributes assigned to the node from each of the isolated bits of the integer value associated with the node;

determining whether the configuration change can be safely supported by a configuration quorum of nodes required to represent the cluster accurately based on the identified node role attributes;

determining whether a required operational quorum of nodes permits access to critical and shared resources based on the identified node role attributes;

seeking endorsement for the configuration change from subsystems that may be affected by the configuration change; and propagating the identified role node attributes to other nodes within the cluster.

* * * * *